L. LEIGH.
PREPARING ANILINE DYES.

No. 186,485. Patented Jan. 23, 1877.

WITNESSES:
A. W. Almquist
J. H. Scarborough

INVENTOR:
Lewis Leigh
BY
Munn
ATTORNEYS.

UNITED STATES PATENT OFFICE.

LEWIS LEIGH, OF PITTSFIELD, MASSACHUSETTS.

IMPROVEMENT IN PREPARING ANILINE DYES.

Specification forming part of Letters Patent No. 186,485, dated January 23, 1877; application filed October 23, 1876.

*To all whom it may concern:*

Figure 1:
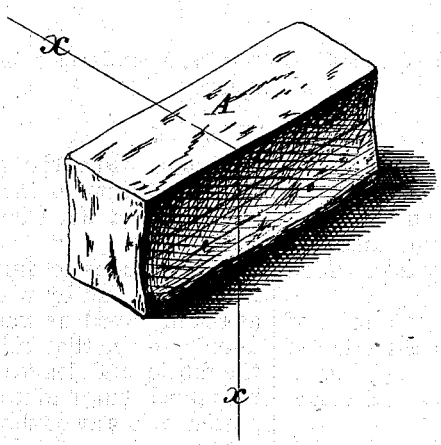
Figure 2:

Be it known that I, LEWIS LEIGH, of Pittsfield, in the county of Berkshire and State of Massachusetts, have invented a new and useful Improvement in Preparing Dyes, of which the following is a specification:

Figure 1 is a perspective view of a cake of my improved dye. Fig. 2 is a cross-section of the same, taken through the line $x$ $x$, Fig. 1.

Similar letters of reference indicate corresponding parts.

The object of this invention is to furnish dyes prepared for jobbing and family use, in such a way as to require no further preparation for use than the simple act of dissolving them in boiling water.

In preparing my improved dyes, I take two parts of soap and one part of glue or gelatine, and mix them together, adding sufficient aniline dye to impart the necessary color. The mixture is then formed into cakes A, of any convenient size and shape.

The relative proportions of the soap and glue or gelatine may be varied as desired without departing from my invention, the proportions given being considered the best.

By mixing the various primary colors, dyes of any desired color or shade of color may be obtained.

In using the dyes from a cake of the desired color, or from several cakes that when mixed will produce the desired color, a proper quantity is shaved into a vessel of boiling water, and when dissolved is ready for use.

Aniline colors are heavier than water, and, therefore, tend to fix themselves on the fabric too suddenly. The soap serves to check this tendency, while the gelatine serves to give greater density to the dyeing liquor, the result being a fixed color that is bright and uniform.

My object is to furnish a preparation for family use, and by which small wares can be as readily dyed as washed. This is not like laundry-blue, that mixes mechanically with the fabric, and leaves the goods when water is applied, but a mixture of soap and animal gluten with any of the aniline dyes that have a chemical affinity for the fabrics, and will not be affected by the washing operation.

I am aware that soap has long been used in connection with annatto, logwood, and other dyes; but of the aniline dyes some require an alkaline and some an acid bath (such as vinegar) to develop and fix the color on the fabric. Where an acid is used with the soap, but without the gelatine, I find that a greasy mass is formed and attaches itself to the goods. The gelatine seems to entirely prevent this, while it enables me to form a clean and convenient dye cake or block, in which the tendency of the dye to disintegrate and the soap to effloresce is arrested by the gelatine.

What I claim as new is—

As a new article of manufacture, a solid block or cake consisting of soap, gelatine, and an aniline dye, the whole soluble in water, and capable of imparting a fixed color to fabrics, as set forth.

LEWIS LEIGH.

Witnesses:
WILLIAM R. PLUNKETT,
JAMES H. FRANCIS.